April 3, 1951  J. H. DEAN  2,547,308
LUMINOUS FISHING FLOAT
Filed Nov. 14, 1949
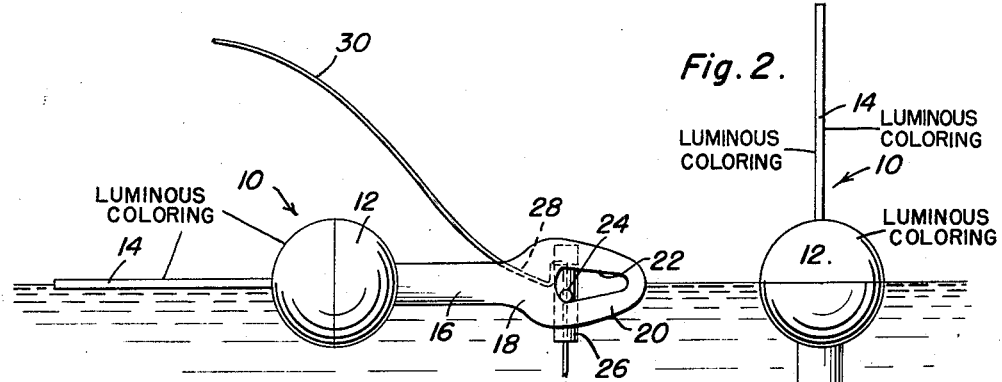
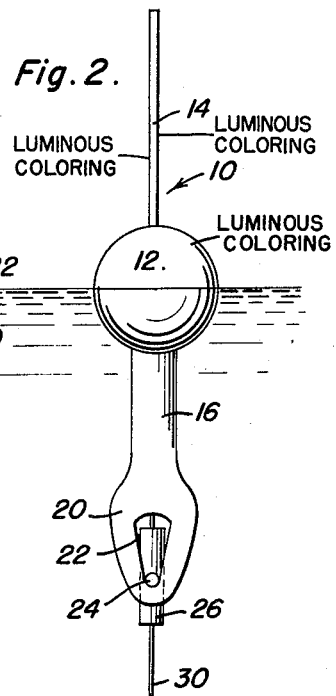
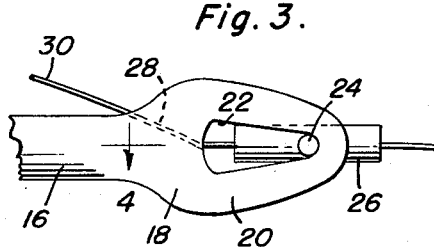
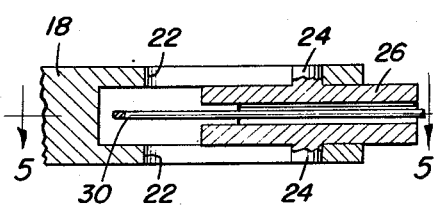
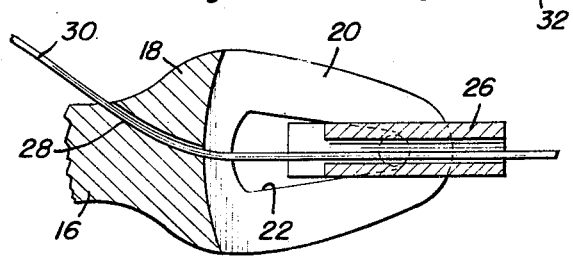
Inventor
John H. Dean
By Clarence A. O'Brien
and Harvey B. Jacobson
Attorneys Patented Apr. 3, 1951

2,547,308

UNITED STATES PATENT OFFICE 2,547,308

LUMINOUS FISHING FLOAT

John H. Dean, Rochester, N. Y.

Application November 14, 1949, Serial No. 127,000

5 Claims. (Cl. 43—17.6)

This invention relates to new and useful improvements in fishing floats and the primary object of the present invention is to provide a float having a luminous plate thereon that will swing to a conveniently visible position in response to a pull on a line carried by the float.

Another very important object of the present invention is to provide a fishing float including a slidable and swingable line receiving member that will permit a fishing line to slide therethrough without pulling the float under water when a fish is engaged with the line extended through the member but which will effect an initial kick or swing to the float as a fish begins to pull the line to alert the fisherman.

A further object of the present invention is the provision of a fishing float that will slidably receive a line and thereby permit the line and fish thereon to be reeled in relatively close to the fisherman.

A still further aim of the present invention is to provide a fishing float of the aforementioned character that is extremely small and compact in structure, efficient and reliable in use, inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a view showing the present invention upon the surface of a fluid medium and in position prior to the engagement of the line associated therewith by a fish;

Figure 2 is a view showing the float actuated to alert a fisherman as a fish strikes the line carried by the float;

Figure 3 is an enlarged fragmentary view showing the position of the line receiving member during casting of the float;

Figure 4 is an enlarged detail sectional view taken substantially on the plane of section line 4—4 of Figure 3; and, Figure 5 is a sectional view taken substantially on the plane of the section line 5—5 of Figure 4.

Referring now to the drawings in detail, wherein for the purpose of illustration, there is disclosed a preferred embodiment of the present invention, the numeral 10 represents an elongated floatable body composed of a spherical portion 12, a tail portion 14 and a head portion 16. The tail portion 14 is disposed diametrically opposite from the head portion 16 and the tail portion 14 and preferably one-half of the spherical portion 12 is painted or colored with a luminous material, such as phosphorus, so that the tail portion can be viewed in a convenient manner.

The head portion 16 includes an enlarged outer, bifurcated, end 18 and the spaced furcations 20 are provided with forwardly tapering slots 22. The slots 22 slidably and rotatably receive a pair of diametrically opposed lugs or pins 24 that project laterally from the central portion of a line receiving member or tubular element 26.

The end 18 is provided with a line receiving passage 28 that enters the space between the furcations 20 and which is so placed as to permit a line 30 to slide therethrough when the member 26 is co-axial with the body 10, as shown in Figures 3, 4, and 5.

In practical use of the present float, a sinker 32 and hook 34 are applied to the line 30 and the line 30 is pulled through the passage 28 and member 26, due to the sinker 32, during casting, since the pins 24 will be moved to the forward ends of the slots 22 with the member 26 co-axial with the body 10, as shown in Figures 3, 4 and 5.

After the line and float have been cast, the pins 24 will slide in the slots 22 and the member 26 will pivot or rotate in the slots 22 until the member 26 is disposed perpendicular to the longitudinal axis of the body 10, as shown in Figure 1.

When a fish strikes the hook 34, the head portion 16, including the enlarged end 18, will be pulled downwardly to raise the tail portion 14 and thereby indicate to the fisherman that a fish has struck the hook.

As the head portion 16 is pulled into the water, the pins 24 will move forwardly in the slots 22 and the relative movement of the body 10 and the member 26 will permit the fish to pull the line through passage 28 and member 26. The body 10 will remain on the surface of the water as the fish pulls the line, also, when the line is reeled in, the said line will slide through passage 28 and member 26, permitting the fish to be within reach of the fisherman.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described the preferred embodiment of the invention the same is susceptible to certain changes fully comprehended by the spirit of the invention as herein described and the scope of the appended claims.

Having described the invention, what is claimed as new is:

1. A fishing float comprising an elongated body member having a first luminous end portion and a second end portion, a line receiving element slidably mounted in the second end portion of said body member, and a line slidably carried by said element, said body member being swung so as to turn upwardly the luminous end portion upon sliding movement of said element in response to a pull on the element by a fish followed by a further pull on the line.

2. The combination of claim 1 wherein said element includes a sleeve having laterally projecting pins thereon, the second end portion of said body member having slots therein slidably receiving said pins.

3. The combination of claim 1 wherein said element includes a tubular member, pins projecting laterally from said tubular member, said body member having elongated slots therein slidably and rotatably receiving said pins.

4. A fishing float comprising an elongated floatable body having a head portion and a tail portion, and a line receiving member slidably supported in the head portion and having a line receiving passage therethrough, said head portion having a line receiving passage therein through which a line is extended to the passage in said member, said member being disposed with its longitudinal axis perpendicular to the longitudinal axis of said body prior to a pull on said line by a fish, a fish striking said line causing the head portion of the body to swing into the water, raising the tail portion and causing the member to pivot and slide relative to the body, said member being positioned to permit the line to slide therethrough as well as through the member when the member is substantially co-axial with the body.

5. A fishing float comprising an elongated body having a bifurcated end portion and a passage leading to the space between the furcations of said bifurcated end portion, each furcation of said bifurcated end portion having an elongated slot therein, a line receiving sleeve in communication with said passage, and a pair of lugs projecting laterally from said sleeve and slidably and rotatably mounted in said slots.

JOHN H. DEAN.

REFERENCES CITED

The following references are of record in the file of this patent:

UNITED STATES PATENTS

| Number | Name | Date |
|---|---|---|
| 1,437,284 | Wagner | Nov. 28, 1922 |
| 1,804,084 | Blake | May 5, 1931 |
| 2,162,659 | Wilson | June 13, 1939 |
| 2,376,958 | Chapman | May 29, 1945 |
| 2,379,676 | Blackstone | July 3, 1945 |
| 2,490,669 | Burke | Dec. 6, 1949 |